(12) United States Patent
Ma et al.

(10) Patent No.: US 10,979,509 B2
(45) Date of Patent: Apr. 13, 2021

(54) AIRCRAFT AND EXTERNAL DEVICE OF THE AIRCRAFT, COMMUNICATION METHOD, DEVICE AND SYSTEM

(71) Applicant: SZ DJI TECHNOLOGY CO., LTD., Shenzhen (CN)

(72) Inventors: Ning Ma, Shenzhen (CN); Dong Zhang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/575,673

(22) Filed: Sep. 19, 2019

(65) Prior Publication Data
US 2020/0014760 A1    Jan. 9, 2020

Related U.S. Application Data

(63) Continuation of application No. PCT/CN2017/077945, filed on Mar. 23, 2017.

(51) Int. Cl.
| | | |
|---|---|---|
| *H04W 72/00* | (2009.01) | |
| *H04W 4/00* | (2018.01) | |
| *H04L 29/08* | (2006.01) | |
| *B64D 45/00* | (2006.01) | |
| *H04W 72/04* | (2009.01) | |
| *H04W 72/12* | (2009.01) | |

(52) U.S. Cl.
CPC .............. *H04L 67/12* (2013.01); *B64D 45/00* (2013.01); *H04W 72/0453* (2013.01); *H04W 72/1268* (2013.01); *B64C 2201/122* (2013.01)

(58) Field of Classification Search
CPC ............ H04B 7/18513; H04B 7/18515; H04B 7/18586; H04B 10/118; H04W 72/04; H04W 72/0413; H04W 72/044; H04W 72/0493; H04W 72/1263; H04W 72/1278; B64D 45/00
See application file for complete search history.

(56) References Cited

U.S. PATENT DOCUMENTS

| | | | |
|---|---|---|---|
| 6,115,371 A | | 9/2000 | Berstis et al. |
| 9,084,276 B2* | | 7/2015 | Grabowsky ....... H04W 72/0446 |

(Continued)

FOREIGN PATENT DOCUMENTS

| | | |
|---|---|---|
| CN | 1614944 A | 5/2005 |
| CN | 1937583 A | 3/2007 |

(Continued)

OTHER PUBLICATIONS

The World Intellectual Property Organization (WIPO) International Search Report for PCT/CN2017/077945 dated Dec. 25, 2017 5 pages.

(Continued)

*Primary Examiner* — Quochien B Vuong
(74) *Attorney, Agent, or Firm* — Anova Law Group, PLLC

(57) ABSTRACT

A wireless communication method includes receiving a data transmission request. The wireless communication method also includes increasing a transmission bandwidth of an uplink based on the data transmission request. The wireless communication method also includes receiving data to be transmitted through the uplink. The uplink is a communication link through which an external device transmits data to an aircraft.

20 Claims, 8 Drawing Sheets

(56) References Cited

U.S. PATENT DOCUMENTS

| | | | |
|---|---|---|---|
| 9,392,570 B1 | 7/2016 | Zhang | |
| 9,576,404 B2 * | 2/2017 | Ziarno | G07C 5/008 |
| 9,797,978 B1 * | 10/2017 | Melamed | G01S 3/14 |
| 9,853,713 B2 * | 12/2017 | Jalali | H01Q 3/24 |
| 10,263,695 B2 * | 4/2019 | Wang | H04L 1/0003 |
| 10,673,520 B2 * | 6/2020 | Westrup | B64C 39/024 |
| 2012/0039254 A1 | 2/2012 | Stapleton et al. | |
| 2012/0252387 A1 | 10/2012 | Haskins et al. | |
| 2015/0236778 A1 | 8/2015 | Jalali | |
| 2017/0090484 A1 * | 3/2017 | Obaidi | B64D 47/08 |

FOREIGN PATENT DOCUMENTS

| | | | |
|---|---|---|---|
| CN | 102474858 A | | 5/2012 |
| CN | 102740511 A | | 10/2012 |
| CN | 102790964 A | | 11/2012 |
| CN | 102791964 A | | 11/2012 |
| CN | 103037376 A | | 4/2013 |
| CN | 103533306 A | | 1/2014 |
| CN | 103874214 A | * | 6/2014 |
| CN | 103874214 A | | 6/2014 |
| CN | 105940627 A | | 9/2016 |
| CN | 106230497 A | | 12/2016 |

OTHER PUBLICATIONS

Xingguang Wei, et al., Software Defined Radio Implementation of a Non-Orthogonal Multiple Access System Towards 5G, IEEE Access, Dec. 9, 2016, pp. 9604-9613, vol. 4.

Haiyang He, The Research and Realization of LTE Real-Time Communication Link on GPP-Based SDR Platform, Beijing University of Posts and Telecommunications Professional Degree Master Thesis, Dec. 1, 2012.

* cited by examiner

AIRCRAFT AND EXTERNAL DEVICE OF THE AIRCRAFT, COMMUNICATION METHOD, DEVICE AND SYSTEM

CROSS-REFERENCE TO RELATED APPLICATION

This application is a continuation application of International Application No. PCT/CN2017/077945, filed on Mar. 23, 2017, the entire content of which is incorporated herein by reference.

TECHNICAL FIELD

The present disclosure relates to the technology field of wireless communication and, more particularly, to an aircraft and an external device of the aircraft, a communication method, a device, and a system.

BACKGROUND

Currently, most aircrafts, such as aerial photographing unmanned aerial vehicles ("UAVs"), may realize data transmission and flight control, etc., by communicating with a ground device, such as a remote controller. The two-way bandwidths of the currently available communication system between the aircraft and the remote controller are typically asymmetric. The communication bandwidth from the remote controller to the aircraft is typically far smaller than the communication bandwidth from the aircraft to the remote controller.

When there is a demand for a large amount of data communication from the remote controller to the aircraft, the bandwidth design of the current communication system cannot satisfy such communication requirement. For example, when upgrading the system firmware of the aircraft using terminal software, the terminal software is typically connected with the remote controller, and transmits the upgrading firmware to the aircraft through the remote controller. Being limited by the communication bandwidth from the remote controller to the aircraft, the transmission time for the upgrading firmware is relatively long, resulting in a slow updating process for the aircraft.

As such, the existing flight communication system design cannot satisfy the data transmission needs.

SUMMARY

The primary technical issues addressed by the present disclosure is to provide an aircraft and its external device, a communication method, a device and a system, such that the communication bandwidth of the uplink between the aircraft and the external device is flexibly adjustable to satisfy various data transmission demands.

In accordance with an aspect of the present disclosure, there is provided a wireless communication method that includes receiving a data transmission request. The wireless communication method also includes increasing a transmission bandwidth of an uplink based on the data transmission request. The wireless communication method also includes receiving data to be transmitted through the uplink. The uplink is a communication link through which an external device transmits data to an aircraft.

In accordance with another aspect of the present disclosure, there is provided a wireless communication device. The wireless communication device includes a first receiving module configured to receive a data transmission request. The wireless communication device also includes a bandwidth adjustment module configured to increase a transmission bandwidth of an uplink based on the data transmission request. The wireless communication device also includes a second receiving module configured to receive data to be transmitted through the uplink. The uplink is a communication link through which the external device transmits data to the aircraft.

In accordance with another aspect of the present disclosure, there is provided an aircraft. The aircraft includes a communication electric circuit configured to establish a communication link to wirelessly communicate with an external device. The aircraft also includes a storage device configured to store a computer program. The aircraft also includes a processor configured to execute the computer program to obtain a data transmission request received through the communication electric circuit. The processor is also configured to execute the computer program to increase a transmission bandwidth of an uplink based on the data transmission request. The processor is further configured to execute the computer program to control the communication electric circuit to receive data to be transmitted through the uplink. The aircraft further includes an aircraft body configured to perform a flight based on flight instructions from the processor. The uplink is a communication link through which the external device transmits data to the aircraft.

According to the technical solutions of the present disclosure, when the uplink between the aircraft and the external device needs to transmit data, the aircraft and the external device may increase the transmission bandwidth of the uplink based on the data transmission request, thereby realizing flexible adjustment of the bandwidth of the uplink between the aircraft and the external device to satisfy various data transmission demands.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Figure 1:
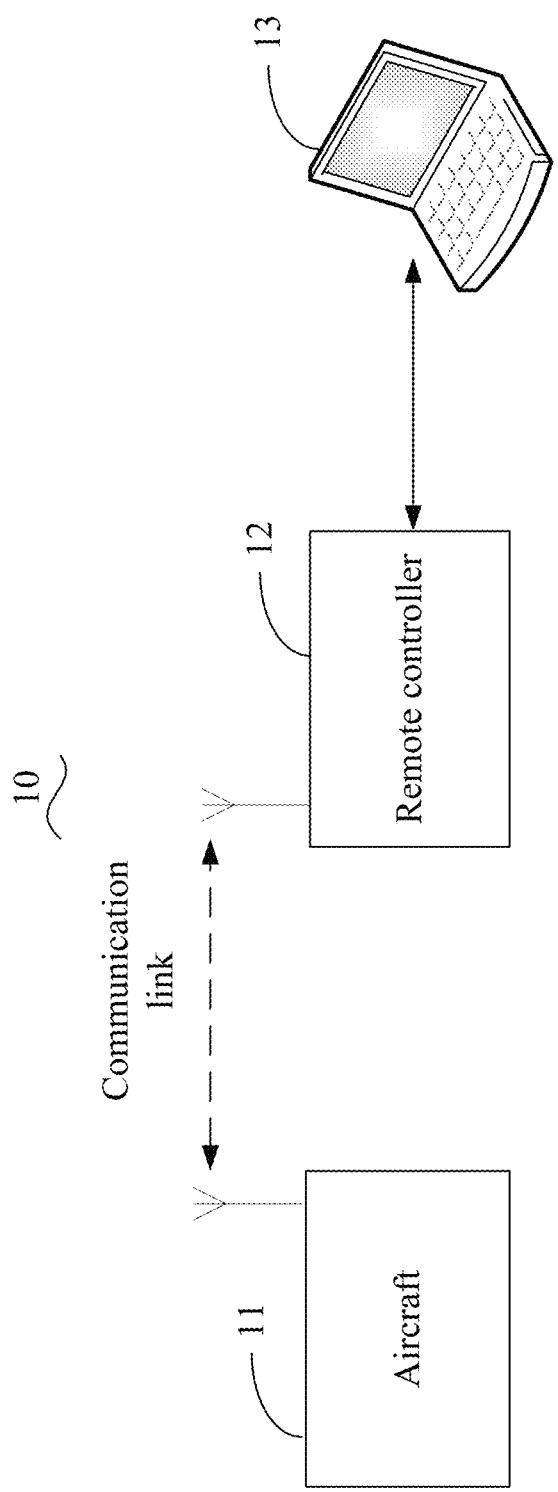
FIG. 1 is a schematic illustration of a wireless communication system, according to an example embodiment.

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "vertical," "left," "right," "up," "upward," "upwardly," "down," "downward," "downwardly," and similar expressions used herein are merely intended for describing relative positional relationship.

In addition, the singular forms "a," "an," and "the" are intended to include the plural forms as well, unless the context indicates otherwise. The terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. In this regard, A and/or B can mean at least one of A or B. The term "communicatively couple(d)" or "communicatively connect(ed)" indicates that related items are coupled or connected through a communication channel, such as a wired or wireless communication channel. The term "unit," "sub-unit," or "module" may encompass a hardware component, a software component, or a combination thereof. For example, a "unit," "sub-unit," or "module" may include a processor, a portion of a processor, an algorithm, a portion of an algorithm, a circuit, a portion of a circuit, etc.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

Next, the technical solutions of the present disclosure will be described in detail with reference to the accompanying drawings.

In the following descriptions, for descriptive purposes rather than for the purpose of limiting the scope of the present disclosure, details of specific system structure, interface, technique are described to assist a person having ordinary skills in the art to understand the present disclosure.

To facilitate the understanding, first, certain terminologies used in the specification will be described. In the present disclosure, the uplink is: a communication link in a wireless communication system, through which an external device transmits data to an aircraft; the downlink is: a communication link in the wireless communication system, through which the aircraft transmits data to the external device; the firmware is: executable file loaded into a hardware and stored therein for controlling the hardware to realize specific functions.

FIG. 1 is a schematic illustration of a wireless communication system. In the present disclosure, a wireless communication system 10 may include an aircraft 11, a remote controller 12, and an upper device 13.

The upper device 13 may be any device that may communicate with the remote controller 12, such as a computer, a cell phone, etc. The upper device 13 and the remote controller 12 may be in a wired or wireless connection. For example, the upper device 13 may be in a wired communication with the remote controller 12 through a USB or a Universal Asynchronous Receiver/Transmitter ("UART").

The upper device 13 may be configured to exchange data related to the aircraft 11 with the remote controller 12. For example, the upper device 13 may transmit to the remote controller 12 relevant control instructions regarding the aircraft 11 or the upgrading firmware of the aircraft 11, and may receive from the remote controller 12 information regarding the aircraft 11, such as the current status of the aircraft 11, the flight path, and the data acquired by the aircraft, etc.

The remote controller 12, as an example of an external device of the present disclosure, may communicate with the aircraft 11 through a wireless communication link. For example, the remote controller 12 may be configured to transmit to the aircraft 11 control instructions (such control instructions may be provided by the upper device 13 or may be generated based on detection of operations by a user on the remote controller 12), or the upgrading firmware transmitted by the upper device 13, etc. The remote controller 12 may receive feedback information returned by the aircraft 11 that may be related to the control instructions or the upgrading firmware, the current status of the aircraft 11, the flight path, and the acquired data, etc. In the present disclosure, the remote controller 12 may include a first communication sub-system through which the remote controller 12 communicates with the upper device 13, and a second communication sub-system through which the remote controller 12 communicates with the aircraft 11, and a remote control joystick measurement sub-system, etc.

The aircraft 11 may be configured to receive control instructions from the remote controller 12 to execute related flight or detection, and receive the upgrading firmware transmitted from the remote controller 12 and perform the upgrade, and return data to the remote controller 12. In some embodiments, the aircraft 11 may include a third communication sub-system through which the aircraft 11 communicates with the remote controller 12, a flight control sub-system, and an acquisition sub-system, etc. The flight control sub-system may be configured to control the flight of the aircraft 11 based on the instructions transmitted by the remote controller 12. The acquisition sub-system may include a camera, a height acquisition device, etc. Correspondingly, the acquired data returned by the aircraft 11 to the remote controller 12 may include image data, height data of historical flight, etc. In some embodiments, the sub-systems are corresponding electrical circuits.

It can be understood that in other embodiments, the external device of the wireless communication system may not be a remote controller, but may be other control device, such as a tablet, a cell phone, a virtual reality ("VR") glass, a wristband, etc., which may be wirelessly connected with the aircraft. In addition, the wireless communication system may not include the above upper device, but instead, may only include, for example, the aircraft and the external device. Further, the system may include multiple aircrafts. The multiple aircrafts may be controlled by a same external device. The system may include multiple external devices, such that at least a portion of the multiple aircrafts are controlled by different external devices.

In the wireless communication system, the preset bandwidth of the uplink between the external device and the aircraft may be relatively small. When there is a need to transmit relatively large amount of data from the external device to the aircraft, such as when transmitting the upgrading firmware, the small bandwidth uplink may not satisfy the data transmission demand. Thus, in the technical solutions of the present disclosure, the bandwidth of the uplink may be adjusted based on the data transmission request. The detailed methods are described in below embodiments.

Figure 2:
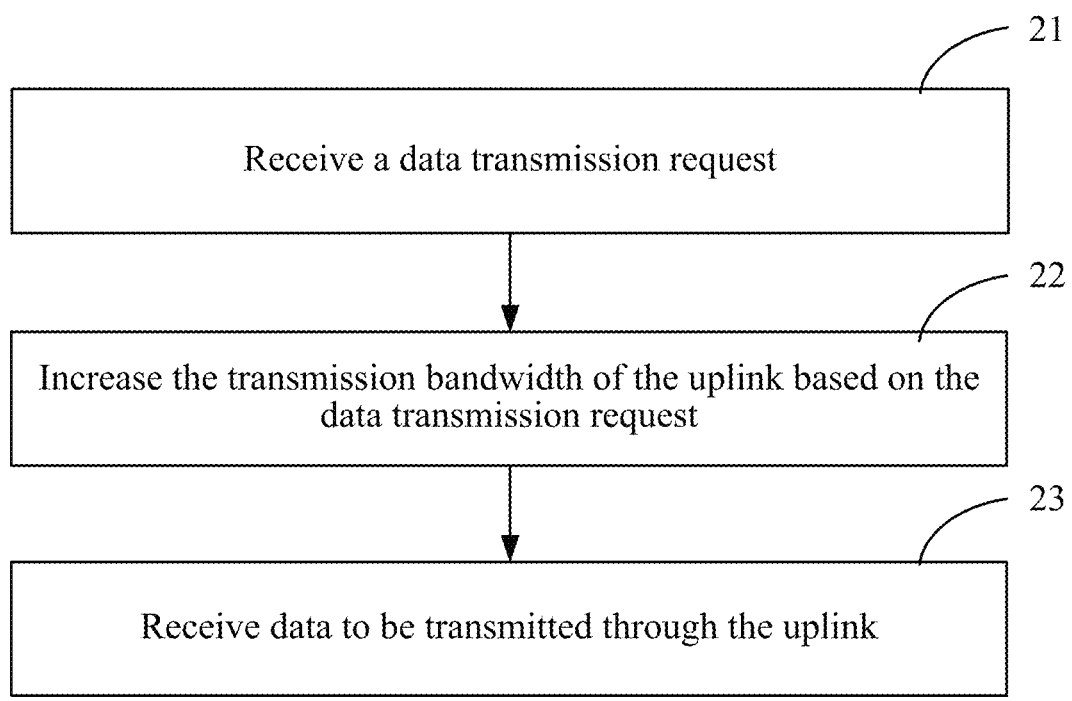
FIG. 2 is a flow chart illustrating a wireless communication method, according to an example embodiment.

FIG. 2 is a flow chart illustrating a wireless communication method. In this embodiment, the method may be executed by the aircraft of the wireless communication system. The method may enable adaptive adjustment of the bandwidth of a link based on a data transmission request. The method may include:

Step 21: receiving a data transmission request.

Step 22: increasing the transmission bandwidth of the uplink based on the data transmission request.

For example, the aircraft may receive a data transmission request transmitted from an external device. The data transmission request may include the size and/or type of the data to be transmitted. The aircraft may determine the size of the data to be transmitted based on the data transmission request, and may increase the transmission bandwidth of the uplink based on the size of the data to be transmitted. For example, the aircraft may determine whether the size of the data to be transmitted is greater than a predetermined data amount. If the size of the data is greater than the predetermined data amount, the aircraft may determine that the bandwidth of the uplink needs to be actually increased, i.e., the increment of the bandwidth is greater than zero; otherwise, the aircraft may determine that the preset bandwidth of the uplink can satisfy the data demand, and there is no need to actually increase the uplink bandwidth, i.e., the increment of the bandwidth is zero.

In some embodiments, the communication electric circuit (e.g., the second communication sub-system and the third communication sub-system of the above embodiment of the system) between the external device and the aircraft may be respectively configured to run corresponding software to define a Software Defined Radio ("SDR") firmware to establish a communication link. That is, the communication electric circuit of the external device may establish a receiving and transmitting link for the external device corresponding to the aircraft through executing the stored SDR firmware. The communication electric circuit of the aircraft may establish a receiving and transmitting link for the aircraft corresponding to the external device through executing the stored SDR firmware. In some embodiments, the receiving link of the external device and the transmitting link of the aircraft is the above described downlink; the transmitting link of the external device and the receiving link of the aircraft is the above described uplink.

In some embodiments, because the preset bandwidth of the uplink is smaller than the preset bandwidth of the downlink, the preset bandwidth is the default bandwidth of the link. Therefore, the aircraft may switch the bandwidths of the uplink and the downlink to actually increase the bandwidth of the uplink.

For example, the aircraft may store two SDR firmwares. An aircraft SDR firmware may be configured to establish a receiving and transmitting link of the aircraft. The external device SDR firmware may be configured to establish a receiving and transmitting link of the external device. Establishing the receiving and transmitting links of the aircraft and the external device refers to establishing the receiving and transmitting links having the preset bandwidths. Step 22 may include: terminating loading of the aircraft SDR firmware in the communication electric circuit of the aircraft, and loading the external device SDR firmware that is disposed inside to the communication electric circuit of the aircraft. At this moment, the communication electric circuit of the aircraft may use a default receiving and transmitting link configured to establish the external device as a new receiving and transmitting link. In the meantime, the external device may use a default receiving and transmitting link configured to establish the aircraft as a new receiving and transmitting link. As such, bandwidths of the uplink and downlink are switched, thereby increasing the bandwidth of the uplink.

As another example, the SDR firmware of the aircraft may include an aircraft portion configured to establish a default receiving and transmitting link of the aircraft and an external device portion configured to establish a default receiving and transmitting link of the external device. The step 22 may include: switching the communication electric circuit of the aircraft from an aircraft mode to an external device mode. That is, the communication electric circuit of the aircraft may switch from running the aircraft portion of the SDR firmware to running the external device portion of the SDR firmware. The aircraft mode may be configured to establish the receiving and transmitting link of the aircraft, and the external device mode may be configured to establish the receiving and transmitting link of the external device. Establishing the receiving and transmitting links of the aircraft and the external device refer to establishing the receiving and transmitting links having preset bandwidths. Then, the communication electric circuit of the aircraft may use the default receiving and transmitting link configured to establish the external device as a new receiving and transmitting link, in the meantime, the external device may use the default receiving and transmitting link configured to establish the aircraft as a new receiving and transmitting link. As such, the bandwidths of the uplink and downlink are switched, thereby increasing the bandwidth of the uplink.

Step 23: receiving data to be transmitted through the uplink.

The external device may transmit data to be transmitted to the aircraft through the uplink. When the bandwidth of the uplink becomes larger, the data transmission speed will be increased. In some embodiments, the data to be transmitted may be the firmware of the aircraft that is configured to upgrade the aircraft. After the aircraft receives the firmware, the aircraft may immediately execute, or may execute while the aircraft is idling, the firmware to perform the upgrade.

In some embodiments, when data are to be transmitted through the uplink, the aircraft and the external device may increase the transmission bandwidth of the uplink based on a data transmission request, thereby realizing flexible adjustment of the uplink bandwidth between the aircraft and the external device to satisfy data transmission demands.

In some embodiments, in step 23, after the aircraft completes receiving the data to be transmitted, the communication bandwidth of the uplink may be restored to a preset bandwidth (i.e., the default bandwidth).

Two examples corresponding to the step 22 will be described: for example, the aircraft may stop (or terminate) loading the external device SDR firmware into the communication electric circuit of the aircraft. The aircraft SDR firmware may be loaded to the communication electric circuit of the aircraft. As another example, in the communication electric circuit of the aircraft, the external device mode may be switched to the aircraft mode, i.e., the external device portion of the SDR firmware run in the communication electric circuit of the aircraft may be switched to the aircraft portion of the SDR firmware. At this moment, the communication electric circuit of the aircraft may re-establish the default receiving and transmitting link of the aircraft, and in the meantime, the external device also re-establishes the default receiving and transmitting link of the external device. As such, the bandwidths of the uplink and downlink are restored to the original settings. Then, the aircraft may process the data to be transmitted, such as executing the upgrade. In some embodiments, the above-described restoration of the bandwidth of the link may be performed after the data processing.

After the transmission of the data to be transmitted is complete, the bandwidths of the uplink and the downlink may be restored to the original settings, thereby avoiding affecting the data transmission through the downlink, and not affecting the normal operations of the aircraft and the external device. In some embodiments, when data are to be transmitted through the downlink, or when the amount of subsequent data to be transmitted through the uplink is smaller than a predetermined data amount, the bandwidths of the uplink and the downlink may be restored.

Figure 3:
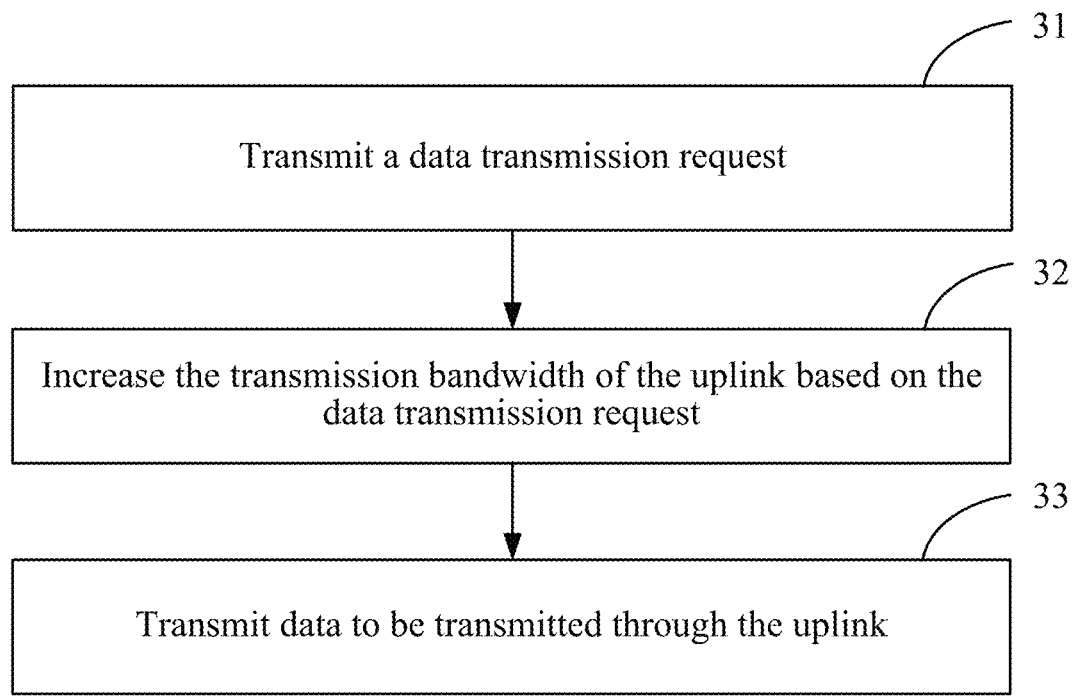
FIG. 3 is a flow chart illustrating a wireless communication method, according to another example embodiment.

FIG. 3 is a flow chart illustrating a wireless communication method. The method may be executed by the external device of the wireless communication system, and may be used to adaptively adjust the bandwidth of a link based on a data transmission request. The method may include:

Step 31: transmitting a data transmission request.

Step 32: increasing a transmission bandwidth of the uplink based on the data transmission request.

For example, the external device may transmit the data transmission request to the aircraft through the uplink, to request to transmit the data to be transmitted. Similar to the communication method of the aircraft described above, the external device may increase the transmission bandwidth of the uplink based on the size of the data to be transmitted corresponding to the data transmission request. For example, the external device may determine whether the size (or amount) of the data to be transmitted is greater than a predetermined data amount. If it is greater than the predetermined data amount, the external device may determine that the uplink bandwidth needs to be actually increased, i.e., the increment of the bandwidth is greater than zero. Otherwise, the external device may determine that the preset bandwidth of the uplink can satisfy the data needs, and there is no need to actually increase the uplink bandwidth, i.e., the increment of the bandwidth is zero.

In some embodiments, the communication electric circuits of the external device and the aircraft may be configured to respectively execute the corresponding SDR firmware to establish communication links. Because the preset bandwidth of the uplink is smaller than the preset bandwidth of the downlink, the preset bandwidths being the default bandwidths of the links, the external device may switch the bandwidths of the uplink and the downlink to actually increase the bandwidth of the uplink.

For example, the external device may store two SDR firmwares. The aircraft SDR firmware may be configured to establish a receiving and transmitting link of the aircraft, and the external device SDR firmware may be configured to establish a receiving and transmitting link of the external device. Establishing the receiving and transmitting links of the aircraft and the external device refers to establishing receiving and transmitting links with preset bandwidths. Step 32 may include: stopping (or terminating) loading the external device SDR firmware into the communication electric circuit of the external device, and loading the built-in aircraft SDR firmware into the communication electric circuit of the external device. Then, the communication electric circuit of the external device may use the default receiving and transmitting link configured to establish the aircraft as its new receiving and transmitting link. Similar to the previous embodiments, in the meantime, the aircraft may use the default receiving and transmitting link configured to establish the external device as its new receiving and transmitting link. As such, the bandwidths of the uplink and downlink are switched, thereby increasing the bandwidth of the uplink.

As another example, the SDR firmware stored in the external device may include an aircraft portion configured to establish the default receiving and transmitting link of the aircraft and an external device portion configured to establish the default receiving and transmitting link of the external device. Step 32 may include: switching the communication electric circuit of the external device from running the external device mode to running the aircraft mode. That is, the communication electric circuit of the external device is switched from running the external device portion of the SDR firmware to running the aircraft portion of the SDR firmware. The aircraft mode may be configured to establish the receiving and transmitting link of the aircraft, and the external device mode may be configured to establish the receiving and transmitting link of the external device. Establishing the receiving and transmitting links of the aircraft and the external device refer to establishing the receiving and transmitting links with preset bandwidths. Then, the communication electric circuit of the external device may use the default receiving and transmitting link configured to establish the aircraft as its new receiving and transmitting link. In the meantime, the aircraft may use the default receiving and transmitting link configured to establish the external device as its new receiving and transmitting link. As such, the bandwidths of the uplink and downlink are switched, thereby increasing the bandwidth of the uplink.

Step 33: transmitting the data to be transmitted through the uplink.

The external device may transmit the data to be transmitted to the aircraft through the uplink. When the bandwidth of the uplink is increased, the data transmission speed will be increased. In some embodiments, the data to be transmitted may be the firmware of the aircraft configured to upgrade the aircraft. After the aircraft receives the firmware, the aircraft may immediately execute, or may execute while the aircraft is idling, the firmware to perform the upgrade.

In some embodiments, when data are to be transmitted through the uplink, the aircraft and the external device may increase the transmission bandwidth of the uplink based on a data transmission request, thereby flexibly adjusting the bandwidth of the uplink between the aircraft and the external device, to satisfy the data transmission needs.

In some embodiments, after step 33, after the external device completes the transmission of the data to be transmitted through the uplink, the communication bandwidth of the uplink may be restored to the preset bandwidth (i.e., the default bandwidth).

Two examples corresponding to step 32 will be described. For example, the external device may stop loading the aircraft SDR firmware into the communication electric circuit of the external device. The external device SDR firmware may be loaded into the communication electric circuit of the external device. As another example, the communication circuit of the external device may be switched from running the aircraft mode to running the external device mode. That is, the communication electric circuit of the external device may be switched from running the aircraft portion of the SDR firmware to running the external device portion of the SDR firmware. Then, the communication electric circuit of the external device may re-establish the default receiving and transmitting link of the external device. In the meantime, similar to the above embodiments, the aircraft may re-establish the default receiving and transmitting link of the aircraft. As such, the bandwidths of the uplink and downlink may be restored to the original settings.

When the transmission of the data to be transmitted is complete, the bandwidths of the uplink and downlink may be restored to the original settings, thereby avoiding affecting the data transmission through the downlink. In some embodiments, when data are to be transmitted through the downlink, or when it is determined that the subsequent amount of data to be transmitted through the uplink is smaller than a predetermined data amount, the restoration of the bandwidths of the uplink and downlink may be performed.

In some embodiments, the method of the present disclosure for increasing the bandwidth of the uplink is not limited to switching the bandwidths of the uplink and downlink. In some embodiments, other methods may be used to increase the bandwidth of the uplink. For example, the downlink may be directly changed to uplink, to realize double-uplink simultaneous transmission. Alternatively, other methods for expanding the uplink may be used.

Figure 4:
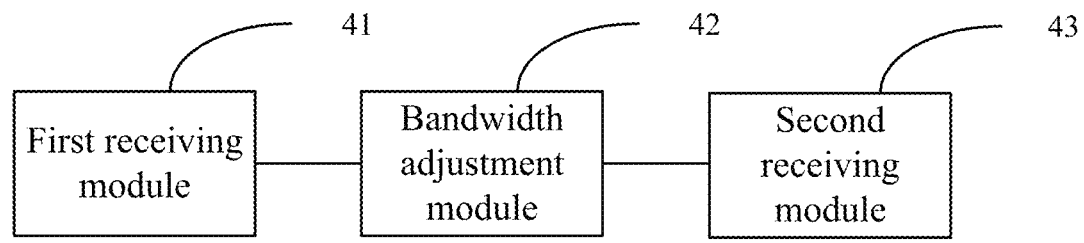
FIG. 4 is a schematic diagram of a wireless communication device, according to an example embodiment.

FIG. 4 is a schematic diagram of a wireless communication device. The wireless communication device may be used in the above aircraft. The wireless communication device may include a first receiving module 41, a bandwidth adjustment module 42, and a second receiving module 43.

The first receiving module 41 may be configured to receive the data transmission request.

The bandwidth adjustment module 42 may be configured to increase the transmission bandwidth of the uplink based on the data transmission request.

The second receiving module 43 may be configured to receive the data to be transmitted through the uplink.

In some embodiments, the communication electric circuits of the aircraft and the external device may be configured to respectively run the corresponding SDR firmwares to establish the communication links.

In some embodiments, the bandwidth adjustment module 42 may be configured to: stop loading the aircraft SDR firmware into the communication electric circuit of the aircraft, and load the built-in external device SDR firmware into the communication electric circuit of the aircraft.

In some embodiments, the bandwidth adjustment module 42 may be configured to, after the reception of the data to be transmitted is complete or before transmitting the subsequent data to be transmitted, stop loading the external device SDR firmware into the communication electric circuit of the aircraft, and to load the aircraft SDR firmware into the communication electric circuit of the aircraft.

In some embodiments, the bandwidth adjustment module 42 may be configured to: switch the communication electric circuit of the aircraft from the aircraft mode to the external device mode.

In some embodiments, the bandwidth adjustment module 42 may be configured to, after the reception of the data to be transmitted is complete, or before transmitting the subsequent data to be transmitted, switch the communication electric circuit of the aircraft from the external device mode to the aircraft mode.

In some embodiments, the data to be transmitted include the upgrading firmware of the aircraft.

The above modules in the present embodiment may be program modules configured to implement the corresponding steps of the above disclosed methods executed by the aircraft. Detailed descriptions may refer to those of the embodiments of the method.

Figure 5:
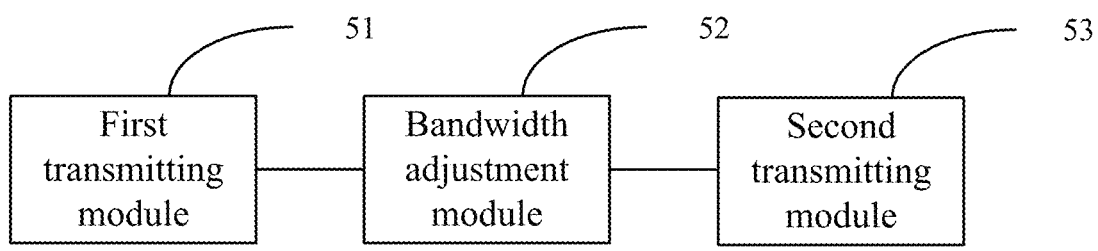
FIG. 5 is a schematic diagram of a wireless communication device, according to another example embodiment.

FIG. 5 is a schematic diagram of a wireless communication device. The device may be included in the external device. The device may include a first transmitting module 51, a bandwidth adjustment module 52, and a second transmitting module 53.

The first transmitting module 51 may be configured to transmit a data transmission request.

The bandwidth adjustment module 52 may be configured to increase the transmission bandwidth of the uplink based on the data transmission request.

The second transmitting module 53 may be configured to transmit the data to be transmitted through the uplink.

In some embodiments, the communication electric circuits of the aircraft and the external device may be configured to respectively run the corresponding SDR firmwares to establish the communication links.

In some embodiments, the bandwidth adjustment module 52 may be configured to: stop loading the external device SDR firmware into the communication electric circuit of the external device, and to load the built-in aircraft SDR firmware into the communication electric circuit of the external device.

In some embodiments, the bandwidth adjustment module 52 may be configured to, after the transmission of the data to be transmitted is complete, or when receiving the data transmission request from the aircraft, stop loading the aircraft SDR firmware into the communication electric circuit of the external device, and load the external device SDR firmware into the communication electric circuit of the external device.

In some embodiments, the bandwidth adjustment module 52 may be configured to: switch the communication electric circuit of the external device from the external device mode to the aircraft mode.

In some embodiments, the bandwidth adjustment module 52 may be configured to, after the transmission of the data to be transmitted is complete or when receiving a data transmission request from the aircraft, switch the communication electric circuit of the external device from the aircraft mode to the external device mode.

In some embodiments, the data to be transmitted include the upgrading firmware of the aircraft.

In some embodiments, the above modules may be program modules configured to realize the corresponding steps of the method executed by the external device. Detailed descriptions may refer to the relevant descriptions of the embodiments of the method.

Figure 6:
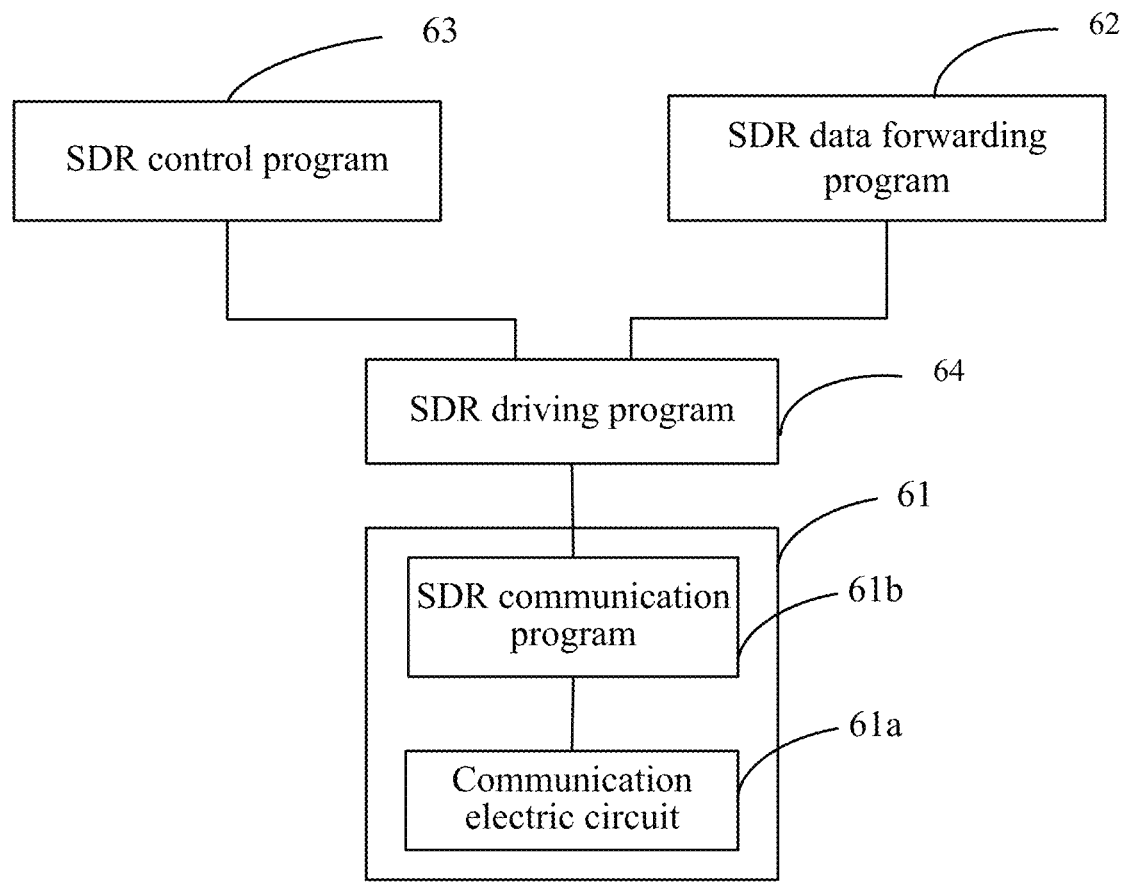
FIG. 6 is a schematic diagram of a wireless communication device, according to another example embodiment.

FIG. 6 is a schematic diagram of a wireless communication device. The wireless communication device may be used in the communication device of the system, such as the aircraft or the external device.

The wireless communication device may be an SDR sub-system, and may include a communication electric circuit 61*a* and various program modules. The various program modules may include an SDR data forwarding program 62, an SDR control program 63, an SDR driving program 64, and an SDR communication program 61*b*.

The SDR communication program 61*b* ma include an SDR firmware run in the communication electric circuit 61*a*.

The communication electric circuit 61*a* may be configured to run the SDR communication program 61*b*, to establish a wireless communication link to realize the data reception and transmission through the wireless communication link. The SDR communication program 61*b* and the communication electric circuit 61*a* may form the SDR communication module 61.

The SDR driving program 64 may be configured to provide to an upper layer (e.g., the SDR data forwarding program 62, the SDR control program 63) the control interface and the data reception and transmission interface of the SDR communication module 61.

The SDR data forwarding program 62 may be configured to forward data received through the SDR communication module 61 to other internal sub-systems of the communication device in which the SDR data forward program 62 is located. In some embodiments, the SDR data forwarding program 62 may be configured to instruct the SDR communication module 61, through the SDR driving program 64, to transmit data to a peer device.

The SDR control program 63 may be configured to control the open/close of the SDR communication module 61, configure the properties of the SDR communication module 61, and load the firmware in the SDR communication module 61.

In some embodiments, the SDR control program 63 may be configured to increase the transmission bandwidth of the uplink based on the data transmission request received by the SDR communication module 61. For example, the SDR control program 63 may stop loading the original SDR firmware into the communication electric circuit 61*a*, and may load a built-in SDR firmware of a peer device into the communication electric circuit 61*a*. The SDR control program 63 may be configured to, after the transmission of the data to be transmitted is complete, stop loading the SDR firmware of the peer device into the communication electric circuit 61*a*, and to re-load the original SDR firmware back to the communication electric circuit 61*a*. As another example, the SDR control program 63 may switch a self mode of the SDR communication module 61 to a peer mode. After the transmission of the data to be transmitted is complete, the SDR control program 63 may switch the peer mode of the SDR communication module 61 back to the self mode. For example, when the communication device is the aircraft, the original SDR firmware may be the aircraft SDR firmware. The SDR firmware of the peer device may be the SDR firmware. The self mode may be the above described aircraft mode, and the peer mode may be the above described external device mode.

Figure 7:
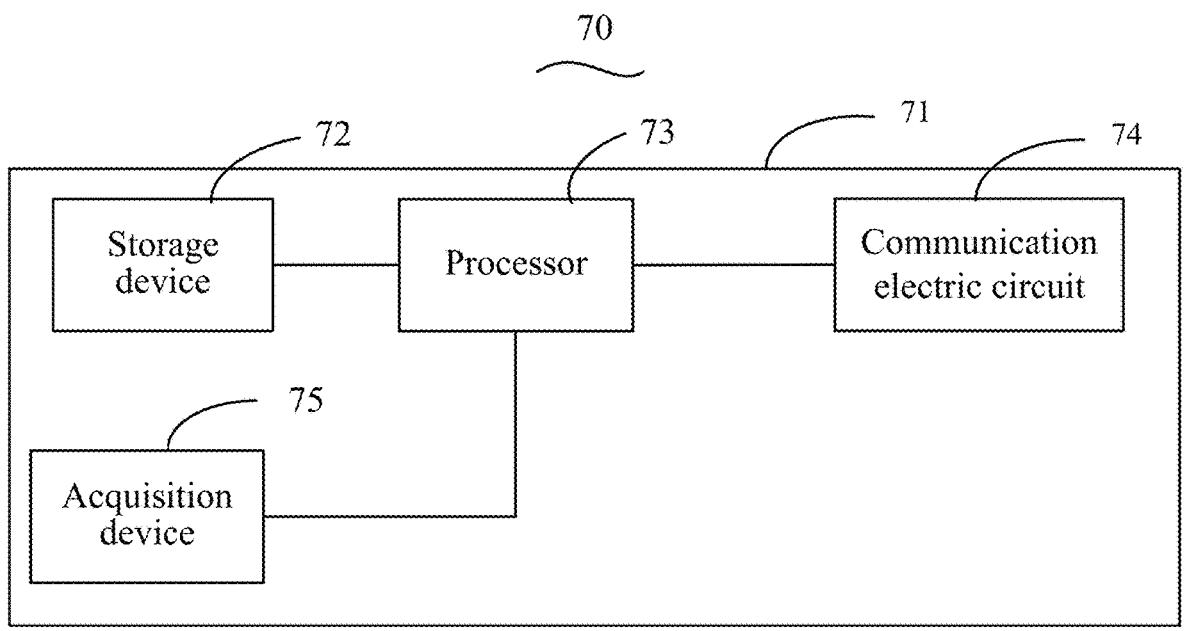
FIG. 7 is a schematic diagram of a UAV, according to an example embodiment.

FIG. 7 is a schematic diagram of an aircraft. In this embodiment, an aircraft 70 may be an embodiment of the aircraft of the above described system. The aircraft 70 may include an aircraft body 71, a storage device 72, a processor 73, and a communication electric circuit 74.

The communication electric circuit 74 may be configured to establish a communication link to perform wireless communication with the external device.

The aircraft body 71 may be configured to carry out flight based on the flight instructions transmitted by the processor 73.

The storage device 72 may be configured to store a computer program, and relevant data obtained or used by the processor 73, such as the data acquired by the aircraft 70, the upgrading firmware transmitted by the external device, etc.

The processor 73 may be configured to execute the computer program. The processor 73 may be configured to: obtain a data transmission request received by the communication electric circuit 74; increase a transmission bandwidth of an uplink based on the data transmission request; and control the communication electric circuit 74 to receive the data to be transmitted through the uplink.

In some embodiments, the communication electric circuit 74 of the aircraft 70 and the communication electric circuit of the external device may be configured to respectively run the corresponding SDR firmwares to establish the communication links.

In some embodiments, the processor 73 may be configured to: stop loading the aircraft SDR firmware into the communication electric circuit 74, and load the built-in external device SDR firmware into the communication electric circuit 74.

In some embodiments, the processor 73 may be configured to: after the reception of the data to be transmitted is complete or before transmitting the subsequent data to be transmitted, stop loading the external device SDR firmware into the communication electric circuit 74; and re-load the aircraft SDR firmware into the communication electric circuit 74.

In some embodiments, the processor 73 may be configured to: switch the communication electric circuit 74 from the aircraft mode to the external device mode.

In some embodiments, the processor 73 may be configured to: after the reception of the data to be transmitted is complete or before transmitting the subsequent data to be transmitted, switch the communication electric circuit 74 from the external device mode of to the aircraft mode.

In some embodiments, the data to be transmitted include the upgrading firmware of the aircraft 70.

In some embodiments, the aircraft 70 may include an acquisition device 75. The acquisition device 75 may be configured to transmit acquired data obtained through detection to the storage device 72. The processor 73 may be configured to retrieve the acquired data from the storage device 72, and to control the communication electric circuit 74 to transmit the acquired data to the external device. The acquisition device may include a camera, a height sensor, a distance sensor, etc.

Figure 8:
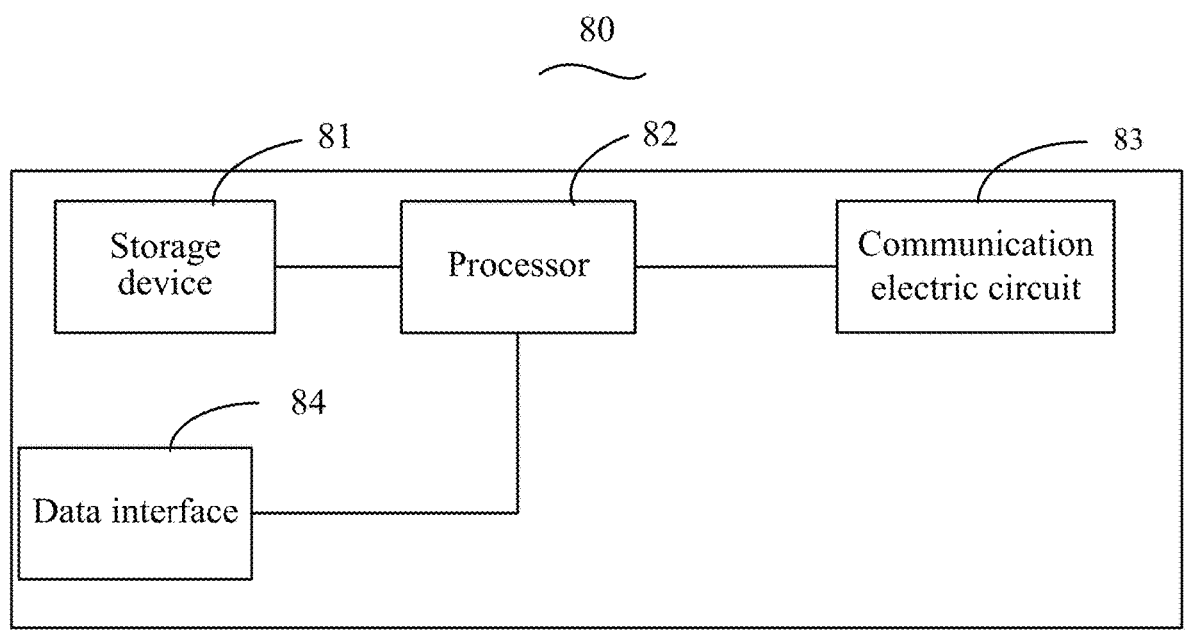
FIG. 8 is a schematic diagram of an external device that communicates with the UAV, according to an example embodiment.

FIG. 8 is a schematic diagram of an external device communicating with the aircraft. In this embodiment, the external device 80 may be an embodiment of the external device included in the above described system. The external device 80 may include a storage device 81, a processor 82, and a communication electric circuit 83.

The communication electric circuit 83 may be configured to establish a communication link to wirelessly communicate with the aircraft.

The storage device 81 may be configured to store a computer program, and data obtained or used by the processor 82, such as the control instructions transmitted by an upper device, an upgrading firmware of the aircraft, acquired data transmitted from the aircraft, etc.

The processor 82 may be configured to execute the computer program to control the communication electric circuit 83 to transmit the data transmission request; increase the transmission bandwidth of the uplink based on the data transmission request; and control the communication electric circuit 83 to transmit the data to be transmitted through the uplink. The uplink is the communication link through which the external device transmits data to the aircraft.

In some embodiments, the communication electric circuit 83 of the external device 80 and the communication electric circuit of the aircraft may be configured to respectively run the corresponding SDR firmwares to establish the communication links.

In some embodiments, the processor 82 may be configured to: stop loading the external device SDR firmware into the communication electric circuit 83, and load the built-in aircraft SDR firmware into the communication electric circuit 83.

In some embodiments, the processor 82 may be configured to: after the transmission of the data to be transmitted is complete or when receiving the data transmission request from the aircraft, stop loading the aircraft SDR firmware into the communication electric circuit 83; and load the external device SDR firmware into the communication electric circuit 83.

In some embodiments, the processor 82 may be configured to: switch the communication electric circuit 83 from the external device mode to the aircraft mode.

In some embodiments, the processor 82 may be configured to, after the transmission of the data to be transmitted is completed or when receiving the data transmission request from the aircraft, switch the communication electric circuit 83 from the aircraft mode to the external device mode.

In some embodiments, the data to be transmitted include the upgrading firmware of the aircraft.

In some embodiments, the external device is a remote controller.

In some embodiments, the external device 80 may include a data interface 84 configured to connect with other devices, such as the upper device of the above described system, to exchange data with the other devices.

In the above embodiments of the aircraft and external device, various components of the aircraft or external device may be coupled through a bus. The bus may include a data bus, a power bus, a control bus, a status signal bus, etc.

In some embodiments, the storage devices 72 and 81 may include a read-only memory, a random-access memory, etc. A portion of the storage device may be non-volatile random access memory ("NVRAM").

In some embodiments, the processors 73 and 82 may control the operations of corresponding devices. The processors 73 and 82 may include a central processing unit ("CPU"). The processors 73 and 82 may include an integrated circuit chip with signal processing capability. The processors 73 and 82 may be a generic processor, a digital signal processor, an application specific integrated circuit ("ASIC"), a field programmable gate array ("FPGA"), or other programmable logic device, gate, or transistor logic device, gate hardware component, etc. The generic processor may be a microprocessor or any other regular processor. The processors 73 and 82 may be configured to execute the instructions stored in the storage devices 72 and 81, to perform the various embodiments of the disclosed methods.

The present disclosure also provides a non-volatile storage medium. The storage medium may store processor-executable computer instructions stored in a storage device included in the aircraft or the external device, such that the processor of the aircraft or the external device may retrieve the computer instructions to execute the operations of the related embodiments.

For example, the non-volatile storage medium may be used in the aircraft, and may store computer-executable computer instructions. The computer instructions may be configured to: obtain a data transmission request received by the aircraft; increase the transmission bandwidth of the uplink based on the data transmission request; and control the aircraft to receive the data to be transmitted through the uplink. The uplink may be a communication link through which the external device transmits data to the aircraft.

As another example, the non-volatile storage medium may be used in the external device that may communicate with the aircraft, and may store processor-executable computer instructions. The computer instructions may be configured to: control the external device to transmit the data transmission request; increase the transmission bandwidth of the uplink based on the data transmission request; and control the external device to transmit the data to be transmitted through the uplink. The uplink may be a communication link through which the external device transmits data to the aircraft.

The present disclosure also provides a non-volatile storage medium. The storage medium may store a program module described in at least one of the embodiments of the wireless communication device.

In the above technical solutions, when data are to be transmitted between the aircraft and the external device through the uplink, the aircraft and the external device may increase the transmission bandwidth of the uplink based on a data transmission request, thereby realizing flexible adjustment of the bandwidth of the uplink between the aircraft and the external device, to satisfy the data transmission needs.

In the above descriptions, for the purpose of explaining the technical solutions rather than for the purpose of limiting the scope of the present disclosure, specific system structures, interface, technique are described with details to a person having ordinary skills in the art to fully understand the present disclosure. However, a person having ordinary skills in the art should appreciate, other embodiments not having such details may also realize the technical solutions of the present disclosure. Under other conditions, detailed descriptions of well-known devices, circuits, and methods have been omitted to avoid affecting the descriptions of the present disclosure by unnecessary details.

What is claimed is:

1. A wireless communication method, comprising:
receiving a data transmission request;
increasing a transmission bandwidth of an uplink based on the data transmission request, wherein increasing the transmission bandwidth of the uplink includes switching bandwidths of the uplink and a downlink; and
receiving data to be transmitted through the uplink,
wherein:
the uplink is a communication link through which an external device transmits data to an aircraft and
the downlink is a communication link through which the aircraft transmits data to the external device.

2. The wireless communication method of claim 1, wherein communication electric circuits of the aircraft and the external device are respectively configured to execute corresponding software defined radio ("SDR") firmwares to establish the communication link.

3. The wireless communication method of claim 2, wherein increasing the transmission bandwidth of the uplink based on the data transmission request further includes:
stopping loading a first SDR firmware into the communication electric circuit of the aircraft; and
loading a built-in second SDR firmware into the communication electric circuit of the aircraft,
wherein the first SDR firmware is configured to establish a receiving and transmitting link of the aircraft, and the second SDR firmware is configured to establish a receiving and transmitting link of the external device.

4. The wireless communication method of claim 3, further comprising:
stopping loading the second SDR firmware into the communication electric circuit of the aircraft; and
loading the first SDR firmware into the communication electric circuit of the aircraft.

5. The wireless communication method of claim 3, wherein the external device comprises a remote controller.

6. The wireless communication method of claim 2, wherein increasing the transmission bandwidth of the uplink based on the data transmission request further includes:
switching the communication electric circuit of the aircraft from a first mode to a second mode,
wherein the first mode is configured to establish a receiving and transmitting link of the aircraft, and the second mode is configured to establish a receiving and transmitting link of the external device.

7. The wireless communication method of claim 1, wherein the data to be transmitted comprise a firmware of the aircraft configured to upgrade the aircraft.

8. A wireless communication device, comprising:
a first receiving module configured to receive a data transmission request;
a bandwidth adjustment module configured to increase a transmission bandwidth of an uplink based on the data transmission request, wherein increasing the transmission bandwidth of the uplink includes switching bandwidths of the uplink and a downlink; and
a second receiving module configured to receive data to be transmitted through the uplink,
wherein:
the uplink is a communication link through which the external device transmits data to the aircraft and
the downlink is a communication link through which the aircraft transmits data to the external device.

9. The wireless communication device of claim 8, wherein communication electric circuits of the aircraft and the external device are respectively configured to execute corresponding software defined radio ("SDR") firmwares to establish the communication link.

10. The wireless communication device of claim 9, wherein the bandwidth adjustment module is configured to:
stop loading a first SDR firmware into the communication electric circuit of the aircraft; and
load a second SDR firmware into the communication electric circuit of the aircraft,
wherein the first SDR firmware is configured to establish a receiving and transmitting link of the aircraft, and the second SDR firmware is configured to establish a receiving and transmitting link of the external device.

11. The wireless communication device of claim 9,
wherein the bandwidth adjustment module is configured to switch the communication electric circuit of the aircraft from a first mode to a second mode, and
wherein the first mode is configured to establish a receiving and transmitting link of the aircraft, and the second mode is configured to establish a receiving and transmitting link of the external device.

12. The wireless communication device of claim 8, wherein the data to be transmitted comprise a firmware of the aircraft configured to upgrade the aircraft.

13. The wireless communication device of claim 8, wherein the external device comprises a remote controller.

14. An aircraft, comprising:
a communication electric circuit configured to establish a communication link to wirelessly communicate with an external device;
a storage device configured to store a computer program;
a processor configured to execute the computer program to:
obtain a data transmission request received through the communication electric circuit;
increase a transmission bandwidth of an uplink based on the data transmission request, wherein increasing the transmission bandwidth of the uplink includes switching bandwidths of the uplink and a downlink; and
control the communication electric circuit to receive data to be transmitted through the uplink; and
an aircraft body configured to perform a flight based on flight instructions from the processor,
wherein the uplink is a communication link through which the external device transmits data to the aircraft and the downlink is a communication link through which the aircraft transmits data to the external device.

15. The aircraft of claim 14, wherein communication electric circuits of the aircraft and the external device are respectively configured to execute corresponding software defined radio ("SDR") firmwares to establish the communication link.

16. The aircraft of claim 15, wherein the processor is configured to:
stop loading a first SDR firmware into the communication electric circuit of the aircraft; and
load a second SDR firmware into the communication electric circuit of the aircraft,
wherein the first SDR firmware is configured to establish a receiving and transmitting link of the aircraft, and the second SDR firmware is configured to establish a receiving and transmitting link of the external device.

17. The aircraft of claim 16, wherein the processor is configured to:
stop loading the second SDR firmware into the communication electric circuit of the aircraft; and load the first SDR firmware into the communication electric circuit of the aircraft.

18. The aircraft of claim 15, wherein the processor is configured to:
switch the communication electric circuit of the aircraft from a first mode to a second mode,
wherein the first mode is configured to establish a receiving and transmitting link of the aircraft, and the second mode is configured to establish a receiving and transmitting link of the external device.

19. The aircraft of claim 14, wherein the data to be transmitted comprise a firmware of the aircraft configured to upgrade the aircraft.

20. The aircraft of claim 14, further comprising:
an acquisition device configured to transmit acquired data obtained through detection to the storage device,
wherein the processor is configured to retrieve the acquired data from the storage, and control the communication electric circuit to transmit the acquired data to the external device.

* * * * *